(12) United States Patent
Li et al.

(10) Patent No.: US 12,718,033 B2
(45) **Date of Patent: *Aug. 25, 2026**

(54) AUTOMATED SCRIPT GENERATION AND AUDIO-VISUAL PRESENTATIONS

(71) Applicant: Microsoft Technology Licensing, LLC, Redmond, WA (US)

(72) Inventors: Ji Li, San Jose, CA (US); Konstantin Seleskerov, Palo Alto, CA (US); Huey-Ru Tsai, Los Altos, CA (US); Muin Barkatali Momin, Santa Clara, CA (US); Ramya Tridandapani, Sunnyvale, CA (US); Sindhu Vigasini Jambunathan, San Jose, CA (US); Amit Srivastava, San Jose, CA (US); Derek Martin Johnson, Sunnyvale, CA (US); Gencheng Wu, Campbell, CA (US); Sheng Zhao, Beijing (CN); Xinfeng Chen, Beijing (CN); Bohan Li, Beijing (CN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 44 days.

This patent is subject to a terminal disclaimer.

(21) Appl. No.: 18/735,417

(22) Filed: Jun. 6, 2024

(65) Prior Publication Data

US 2024/0320451 A1 Sep. 26, 2024

Related U.S. Application Data

(63) Continuation of application No. 17/318,170, filed on May 12, 2021, now Pat. No. 12,032,922.

(51) Int. Cl.

*G06F 40/56* (2020.01)
*G06F 3/0481* (2022.01)

(Continued)

(52) U.S. Cl.

CPC ............ *G06F 40/58* (2020.01); *G06F 3/0481* (2013.01); *G06F 16/24578* (2019.01); *G06F 40/205* (2020.01); *G10L 13/02* (2013.01)

(58) Field of Classification Search

CPC ...... G06F 40/58; G06F 3/0481; G06F 40/205; G06F 40/56; G06F 40/30

(Continued)

(56) References Cited

U.S. PATENT DOCUMENTS 12,032,922 B2 * 7/2024 Li ........................ G06F 3/0481

OTHER PUBLICATIONS

Communication pursuant to Article 94(3) EPC Received for European Application No. 22723260.0, mailed on Jun. 30, 2026, 9 pages.

* cited by examiner

*Primary Examiner* — George C Monikang

(57) ABSTRACT

Automatic generation of intelligent content is created using a system of computers including a user device and a cloud-based component that processes the user information. The system performs a process that includes receiving an input document and parsing the input document to generate inputs for a natural language generation model using a text analysis model. The natural language generation model generates one or more candidate presentation scripts based on the inputs. A presentation script is selected from the candidate presentation scripts and displayed. A text-to-speech model may be used to generate a synthesized audio presentation of the presentation script. A final presentation may be generated that includes a visual display of the input document and the corresponding audio presentation in sync with the visual display.

20 Claims, 9 Drawing Sheets

(51) Int. Cl.

| | |
|---|---|
| ***G06F 16/2457*** | (2019.01) |
| ***G06F 40/205*** | (2020.01) |
| ***G06F 40/30*** | (2020.01) |
| ***G06F 40/58*** | (2020.01) |
| ***G10L 13/02*** | (2013.01) |

(58) Field of Classification Search
USPC ................................ 704/231–232, 246, 251
See application file for complete search history.

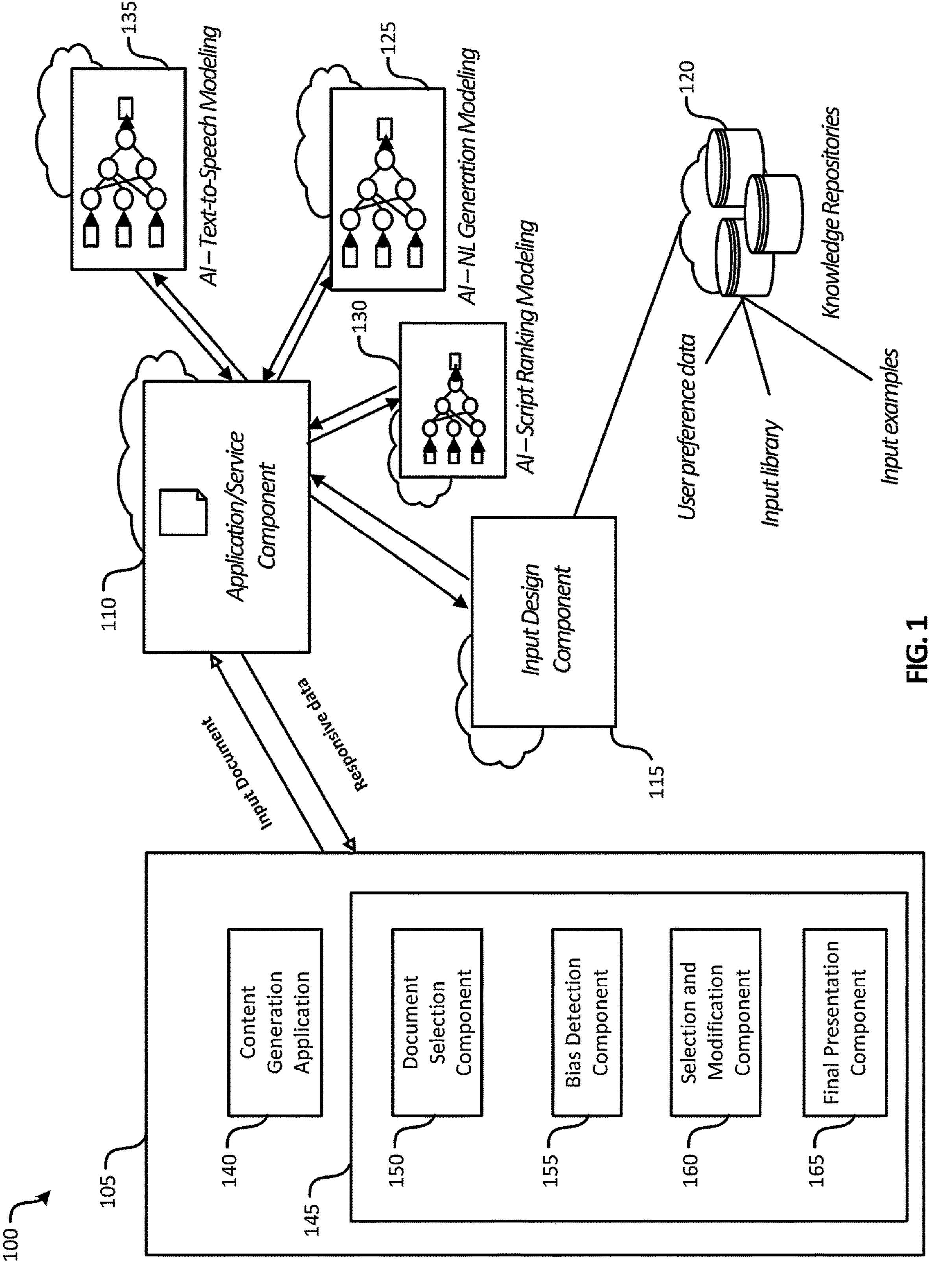
100
105
Content Generation Application
140
145
Document Selection Component
150
Bias Detection Component
155
Selection and Modification Component
160
Final Presentation Component
165
Input Document
Responsive data
Application/Service Component
110
Input Design Component
115
AI – Script Ranking Modeling
130
AI – NL Generation Modeling
125
AI – Text-to-Speech Modeling
135
120
Knowledge Repositories
User preference data
Input library
Input examples
FIG. 1

AUTOMATED SCRIPT GENERATION AND AUDIO-VISUAL PRESENTATIONS

CROSS REFERENCE TO RELATED APPLICATIONS

This application is a continuation of U.S. patent application Ser. No. 17/318,170, titled "AUTOMATED SCRIPT GENERATION AND AUDIO-VISUAL PRESENTATIONS," filed May 12, 2021, the contents of which is incorporated herein by reference in its entirety for all purposes.

BACKGROUND

Traditionally, users create content using content development tools such as presentation creation applications, word processing applications, and so forth. A final presentation may be created that includes a slide deck along with an accompanying script that the user may use to present to an audience. The content and design of the material, including the script, is created by the user. The presentation is then generally performed by a user that reads the script while displaying the presentation content (e.g., a presentation slide deck) to the audience. The script content is generated by a user, and the presentation is typically manually performed.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method for automatically generating a presentation script from an input document. The computer-implemented method includes receiving the input document. The input document is parsed using an input design model to generate inputs for a natural language generation model that generates one or more candidate presentation scripts based on the inputs. A presentation script selected from the candidate presentation scripts is displayed. Other embodiments of this aspect include corresponding computer systems, apparatus, and computer programs recorded on one or more computer storage devices, each configured to perform the actions of the methods.

Implementations may include one or more of the following features. The computer-implemented method may include displaying the candidate presentation scripts, and receiving a selection of the presentation script from the displayed candidate presentation scripts. Optionally, the input document may include a presentation slide deck. Optionally, the computer-implemented method may include ranking the candidate presentation scripts with a ranking model, and displaying the candidate presentation scripts in ranked order. In some embodiments, the natural language generation model is one of a number of natural language generation models, and each of the natural language generation models generates at least one of the candidate presentation scripts. The computer-implemented method may include inputting the presentation script into a text-to-speech model, and generating an audio presentation with the text-to-speech model based on the final script. Optionally, the audio presentation may be generated using the user's voice. The computer-implemented method may include generating a final presentation that may include a visual display of the input document and the audio presentation in sync with the visual display. The computer-implemented method may include receiving a request to modify an output language of the audio presentation in the final presentation to a requested language, and translating the output language to the requested language in the final presentation. The computer-implemented method may include receiving feedback from an audience after presentation of the presentation script, and adjusting parameters of the input design model, the natural language generation model, or a combination of both based on the feedback. Implementations of the described techniques may include hardware, a method or process, or computer software on a computer-accessible medium.

BRIEF DESCRIPTION OF THE DRAWINGS

Many aspects of the disclosure can be better understood with reference to the following drawings. The components in the drawings are not necessarily drawn to scale. Some components or operations may not be separated into different blocks or may be combined into a single block for the purposes of discussion of some embodiments. Moreover, in the drawings, like reference numerals designate corresponding parts throughout the several views. While several embodiments are described in connection with these drawings, the disclosure is not limited to the embodiments disclosed herein. The technology is amendable to various modifications and alternative forms. The disclosure and figures herein are intended to provide a description of certain embodiments, and the intent is to cover all alternatives, modifications, and equivalents.

FIG. 1 illustrates an overview of a system for automated script generation, according to some embodiments.

DETAILED DESCRIPTION

Figure 2:
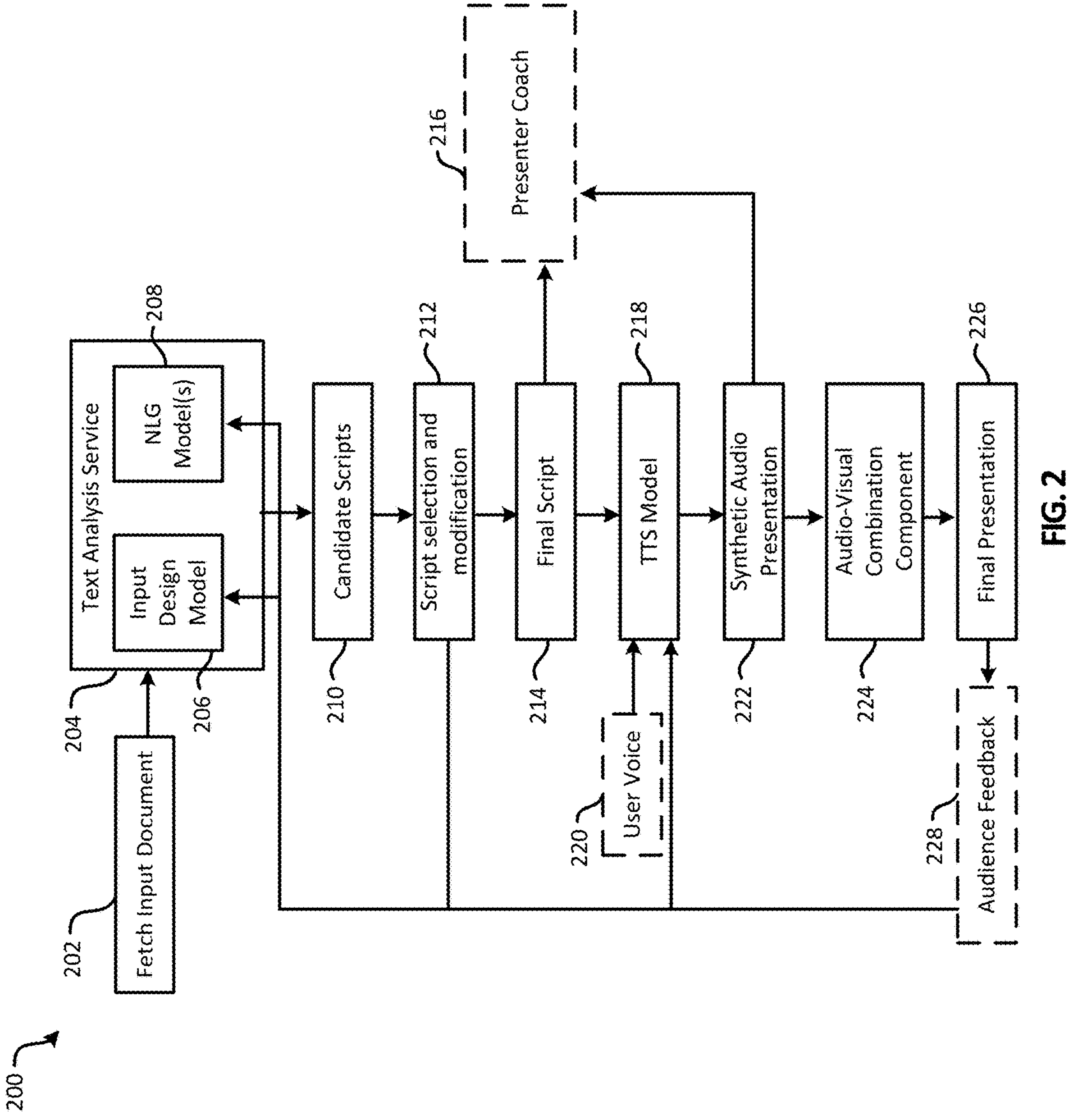
FIG. 2 illustrates a flowchart of behavior of the automated script generation system, according to some embodiments.

Content design applications offer users a way to generate and edit content. Word processing applications (e.g., MICROSOFT WORD®), presentation creation applications (e.g., MICROSOFT POWERPOINT®), and other content development applications are available to users, and some offer various components, including neural networks or advanced intelligence tools, to suggest design and layout options for users. Detailed user text input is needed in these applications to generate the content. Further, when a user generates, for example, a presentation slide deck in a presentation creation application, the corresponding speech (i.e., script) for the presentation must be created by the user. Many users would benefit from assistance to generate the speech content timely and completely.

The present disclosure provides a way to generate entire speech content based on a document input from a user. The disclosed system may be implemented with any content development application. The solution includes a complete, natural language generation modelling powered solution to allow users to generate content with minimal inputs in an iterative fashion. The user may be given the opportunity to provide a document with information related to the desired speech. The system may use the document to generate input for the natural language generation model, provide the input to the natural language generation model, obtain the output from the natural language generation model, and suggest complete speech content to the user for giving the speech. In some embodiments, a text-to-speech model may be used to generate a synthesized speech, so the user need not even present the speech. Further, in some embodiments, the synthesized speech may be synchronized with a presentation slide deck to provide a complete audio speech with synchronized visual content. This process may be iterative. The user may make edits or request additional content, clarification, design assistance, and so forth as many times as desired such that the originally created speech content is updated and modified based on minimal additional input by the user until the user selects and finalizes the suggested results. In this way, the user may save substantial time to generate complete and accurate speech content.

Turning to FIG. 1, an exemplary system 100 for automated intelligent script generation is depicted. The system 100 includes user system 105, application service component 110, input design modelling component 115, knowledge repositories 120, natural language generation modelling component 125, script ranking modelling component 130, and text-to-speech (TTS) modelling component 135.

User system 105 may include content generation application 140, and user system design components 145. The user system design components 145 may include document selection component 150, bias detection component 155, selection and modification component 160, and final presentation component 165. System 100 may include any number of user systems 105, and user system 105 may be any computing system including a laptop, desktop, server, or tablet such as, for example, computing system 1000 as depicted with respect to FIG. 10.

User system 105 may include memory for storing instructions that are executed by a processor. The memory may include content generation application 140 and user system design components 145. The content generation application 140 may be any content creation application including, for example, a word processing application (e.g., MICROSOFT WORD®), a presentation creation application (e.g., MICROSOFT POWERPOINT®), or any other content creation application (e.g., MICROSOFT EXCEL®, MICROSOFT ONENOTE®, MICROSOFT OUTLOOK®, MICROSOFT PUBLISHER®, MICROSOFT PROJECT®, or the like). The user system design components 145 may be included on the user system 105 as shown. In some embodiments, the user system design components 145 may be cloud based and access using a user interface on user system 105. In some embodiments, the user system design components 145 may be duplicated on user system 105 for local use and in a cloud environment for use by the cloud components. User system 105 may include any number of other components, software, firmware, hardware, or the like that are not included here for the sake of brevity.

The document selection component 150 is used to allow the user to select an input document upon which the script content will be based. In some embodiments, the user may select a document generated automatically, such as using a system as described in U.S. patent application Ser. No. 17/152,193, filed Jan. 19, 2021, entitled "AUTOMATED INTELLIGENT CONTENT GENERATION," which is incorporated herein by reference for all purposes. In some embodiments, the automatically generated content may be automatically fed into the document selection component 150 as the input document without user intervention. In some embodiments, the document selection component 150 may perform initial parsing of the document and determine an intent or topic of the document. Upon determining the intent, the document selection component 150 may, in some embodiments, provide the topic to the user to confirm the basis of the script and/or provide suggestions to the user for obtaining the script the user desires. As used in the examples herein, the user may be attempting to generate a script to accompany a visual presentation on photosynthesis. Upon receiving the input document (e.g., a presentation slide deck), the document selection component 150 may parse the document and determine the user's intent is to generate a speech to accompany the presentation slide deck on photosynthesis. Before sending the input document to the application service component 110 for speech generation, the document selection component 150 may provide a confirmation dialog box to the user confirming that the user is attempting to generate a speech on photosynthesis. When the user confirms, the document selection component 150 may provide the input document, and in some embodiments the confirmation information, to the application service component 110. If the document selection component 150 got it wrong, and for example, tried to confirm that the user was attempting to generate a speech on, for example, pollution, the document selection component 150 may, for example, provide an opportunity for the user to enter a short phrase of the desired speech content or provide suggestions for the user to make to the input document to obtain the desired script content.

The bias detection component 155 may be called to assess the input document to determine whether it is likely to generate biased, toxic, or irrelevant content. The bias detection component 155 may also be used to assess the output from the natural language generation modelling component 125 to determine if the content is biased, toxic, or irrelevant. Biased, toxic, or irrelevant output may be generated at least in part due to the training of the natural language generation model in the natural language generation modelling component 125. For example, the Generative Pre-trained Transformer 3 ("GPT-3") may be the natural language generation model used in system 100. It is an autoregressive language model that uses deep learning. GPT-3 is a powerful natural language generation model that produces human-like text. However, its training was completed using unfiltered, uncleaned, and potentially biased content. Accordingly, the output may be biased, toxic, or otherwise irrelevant. Such output may be filtered using the bias detection component 155. Further, certain input is more likely to generate such unwanted output. The bias detection component 155 may identify the input as likely to produce unwanted output and filter the input to avoid the result. As an example, the input document may be a presentation slide deck on Donald Trump. While this input may not be flagged by the bias detection component 155, the output may include, for example, "Donald Trump is the worst U.S. President in history" (i.e., biased), "Donald Trump is the best television personality and businessman" (i.e., biased), or "Donald Trump is a businessman and the 45$^{th}$ U.S. President" (i.e., neutral/factual). Further, results may include inappropriate language (e.g., toxic) or otherwise irrelevant content. The bias detection component 155 may filter and/or flag such unwanted results. Further, the bias detection component 155 may be an artificial intelligence ("AI") component such as a machine learning algorithm that learns over time which types of inputs result in unwanted output. As such, the input may be flagged or a bias potential assigned. When the bias detection component 155 identifies a probability that the input may provide unwanted results or the output is toxic, biased, or otherwise irrelevant (i.e., a bias potential exists or exceeds a threshold), hints may be provided by the bias detection component 155 for obtaining more relevant or wanted results. In some embodiments, a hint component may be a separate component for creation of such hints. Such hint component may be an AI component that generates the hints to help avoid unwanted output. The bias detection component 155 may include a blocklists that detects toxic text that may not be processed. In such cases, the bias detection component 155 may, for example, assign a bias potential that exceeds the threshold. In some embodiments, the bias detection component 155 may learn over time and add new terms to the blocklist when results from the natural language generation modelling component 125 are toxic or when a user provides feedback that results are toxic or bad or that the input resulted in bad or toxic output. In some embodiments, these results and feedback can be used to expand the blocklist.

Once the document selection component 150 has processed the input document, the input document and any other relevant information collected by the document selection component 150 is sent to the application service component 110, which may be cloud based. The application service component 110 may send the input document to the input design modelling component 115. The input design modelling component 115 is used to generate the inputs that are appropriate for input to the natural language generation models in the natural language generation modelling component 125. The input design modelling component 115 may be a design model that is used to parse the input document and generate the appropriate inputs. The input design modelling component 115 may be an AI component that uses a machine learning algorithm or neural network to develop better inputs over time. The input design modelling component 115 may access the knowledge repositories 120 including user preference data, an input library, and input examples to generate the inputs and return them to the application service component 110. The application service component 110 may provide the inputs to the natural language generation modelling component 125 and obtain the response content (e.g., the speech). In some embodiments, the input document may be quite long, which may generate excessive response content. In some embodiments, the input design modelling component 115 may generate inputs to ensure that the inputs are short enough to generate reasonable length content or may break up the inputs to generate appropriate content. The application service component 110 may receive the response content (i.e., candidate scripts) from the natural language generation modelling component 125. In some embodiments, the natural language generation modelling component 125 may generate one or more candidate scripts. In some embodiments, more than one natural language generation model may be used in the natural language generation modelling component 125 to generate multiple candidate scripts. For example, the Turing model (created by MICROSOFT®) and the GPT-3 model may both be used to each generate one or more candidate scripts. In some embodiments, the input design modelling component 115 may determine which model to use to generate candidate scripts and/or may generate differing inputs for each model to generate several candidates that vary from each model. Various methods including varying the input and using multiple models may be used to ensure a number of candidate scripts are generated for the user to review.

The application service component 110 may provide the candidate scripts, in some embodiments, to the script ranking modelling component 130. The script ranking model in the script ranking modelling component 130 may rank the candidate scripts in an order based on, for example, known preferences of the user, completeness of the script, likelihood that the script meets the user's criteria, and the like. The script ranking may be provided to the application service component 110. The application service component 110 provides the candidate scripts to the user system 105.

The selection and modification component 160 may be a component displays generated candidate scripts to the user for review, selection, and modification. The candidate scripts may be provided/displayed in ranked order if the script ranking modelling component 130 was used. The user may be given the opportunity to review the scripts, request modifications to the scripts, and select a final script for use. When the user requests modifications, for example, the user may request with short text strings for additional or changed information, which the selection and modification component 160 may then send to the input design modelling component 115 for processing of new content with the natural language generation modelling component 125. The new content may then be incorporated into the script by the selection and modification component 160. In some embodiments, the revised inputs from the input design modelling component 115 may be used in combination with inputs based on the input document to generate an entirely new script to replace the script the user requested modifications on. The user may iteratively modify the candidate scripts until the user is happy with one or more candidate scripts. Once the user has made any desired modifications and requests, the user may select a candidate script for use as the final script using the selection and modification component 160. In some embodiments, the entire candidate selection may be automated such that no user input is required to select a final script.

In some embodiments, the user may then use the final script for presenting a speech. In some embodiments, the user may wish to further generate a synthesized speech for presentation. The final presentation component 165 may take the final script and provide it to the application service component 110 for a TTS conversion. The application service component 110 may provide the final script to the TTS modelling component 135. In some embodiments, the user may provide a voice sample such that the TTS model of the TTS modelling component 135 generates the synthesized speech in the user's voice. In other embodiments, the user may select a voice for use. In yet other embodiments, a standard voice model is selected and used to synthesize the speech using the TTS modelling component 135. The TTS modelling component 135 provides the synthesized audio of the speech to the application service component 110. The application service component 110 provides the synthesized audio to the user system 105.

In some embodiments, the final presentation component 165 may be used to present the generated script in a text-based format to the user. In some embodiments, the final presentation component 165 may be used to present the synthesized audio to the user in an audio format. In some embodiments, the user may have a visual presentation, for example the input document may be a presentation slide deck, that will be used to present the speech to an audience. The final presentation component 165 may, in some embodiments, synchronize the visual presentation and the synthesized audio such that the complete audio-visual presentation is provided to the user. In some embodiments, the final presentation component 165 may allow the user to make modifications to adjust the synchronization, content, language of the synthesized audio (e.g., translate or change the voice selection), or the like to finalize the presentation.

FIG. 2 illustrates a flowchart 200 of actions performed by system 100. The steps include actions performed by user system design components 145, content generation application 140, application service component 110, input design modelling component 115, natural language generation modelling component 125, script ranking modelling component 130, and text-to-speech (TTS) modelling component 135. Many of the components used to perform the actions in flowchart 200 include artificial intelligence such as neural networks, machine learning, AI modelling, and the like.

The input document is fetched at step 202. The input document may be fetched using a user interface specific to the user system design components 145 or by a user interface of the content generation application 140. The document selection component 150 may be used to select the input document and may, in some embodiments, parse the document to determine the topic to obtain confirmation of the topic. For example, if the input document is used to identify pollution as the topic of the speech, but the speech topic is desired to be photosynthesis, the document selection component 150 may provide suggestions to the user to obtain the desired result by modifying the input document or may ask the user the topic and provide the topic with the input document to the application service component 110. Information about the discrepancies may be logged. The logged information may be used to improve components of the system, such as the input design modelling component 115 and the document selection component 150.

In some embodiments, the bias detection component 155 may be used to determine if the input document has a bias potential. In other words, the bias detection component 155 may determine if the input document is likely to result in biased, toxic, irrelevant, or otherwise unwanted output. The bias detection component 155 may provide a binary (biased/not-biased) output for deciding whether the output is likely to be biased. In some embodiments, the bias detection component 155 may assign a score to the input document, and based on the score exceeding a threshold, make the decision whether the output is likely to be biased. If the bias detection component 155 determines there is a bias potential that exceeds a threshold, for example, the bias detection component 155 may provide suggestions or hints for better results. The bias detection component 155 may be important based on the learning method of the natural language generation model. As discussed above, GPT-3 learned from unfiltered text data that had little cleaning or debiasing. The bias, toxicity, and other issues in the source data are then carried into the model. Accordingly, the bias detection component 155 may help prevent offensive, biased, toxic, or otherwise unwanted output.

Once the input document has been obtained, and in some embodiments processed, the text analysis service 204, which includes the input design modelling component 115 and the natural language generation modelling component 125, generates candidate scripts. At step 206, the input design modelling component 115 generates the inputs for the natural language generation modelling components 125. The input design modelling component 115 may generate the inputs based on various factors. For example, for a long input document, the information may be broken up into smaller chunks of data for generation of inputs such that the natural language models do not generate excessively large amounts of script content. As another example, varying inputs may be generated for input to a natural language generation model to ensure multiple candidate scripts are generated. As yet another example, inputs may be generated for multiple natural language generation models (e.g., GPT-3, Turing model, and so forth) so that multiple candidate scripts are generated. The inputs are fed into the natural language generation modelling component 125 at step 208, and each natural language generation model generates one or more candidate scripts, which are output at step 210.

In some embodiments, the candidate scripts may be analyzed by the bias detection component 155 to ensure the output is not biased, toxic, or otherwise unwanted. In some embodiments, the candidate scripts may be ranked by the script ranking modeling component 130. At step 212, the script selection and modification component 160 displays the scripts to the user for review, selection and/or modification. The user may iterate the generation of the candidate scripts by requesting changes in the user interface that sends the requests back to the text analysis service 204 for generating modified candidate scripts that can be further reviewed. This process may iterate until the user has at least one satisfactory candidate script. Once the user has a candidate script that the user is happy with, the user may select the candidate script as the final script. The final script may be viewed at step 214. In some embodiments, the final script may be modified or further refined by the presenter coach (e.g., MICROSOFT PRESENTER COACH®) at step 216.

In some embodiments, the user may wish to obtain a synthetic audio output of the final script. At step 218, the final script can be sent to TTS modelling component 135 to generate the synthetic audio output of the final script. In some embodiments, the user may upload the user voice at step 220 to input into the TTS model such that the audio output is in the user's voice. Various selections may be made for generating the audio output including the language, whether translations are available, the voice used for the audio output, and the like. Once the TTS model generates the audio output, it is output and provided to the user at step 222. In some embodiments, this audio output may also be provided to the presenter coach and coaching modifications may be provided at step 216 for the audio output.

In some embodiments, a visual presentation may be used, for example, as the input document. For example, the input document may be a presentation slide deck. In some embodiments, a visual presentation may be generated after the script is generated. At step 224, the final presentation component 165 may synchronize the visual presentation and the audio output so that a final, synchronized audio-visual presentation is generated. At step 226, the final presentation may be presented to an audience. In some embodiments, the final presentation may include the user presenting the final script with the user's own voice and manually synchronizing any visual presentation with the script, the audio-visual presentation being fully automated presented using, for example, a system such as MICROSOFT LIVE®, the synthesized audio output with a visual presentation manually synchronized by the user, or any combination of automatic and manual presentation and synchronization. At step 228, audience feedback may be obtained via, for example, a survey. The audience feedback may be fed back into the text analysis service 204 to tune the input design model of the input design modelling component 115 and the natural language generation models of the natural language generation modelling component 125 by, for example, modifying parameters to ensure better outputs.

As described with respect to FIG. 2, the components of the automated intelligent script generation system 100, and specifically the user system design components 145 may be used in conjunction with other components of the content generation application 140 to provide candidate scripts from the natural language generation model 125 as well as to provide coaching and other suggestions from other tools utilized by or incorporated into the content generation application 140. Some examples are provided in the exemplary user interfaces depicted in FIGS. 4-8.

Figure 3:
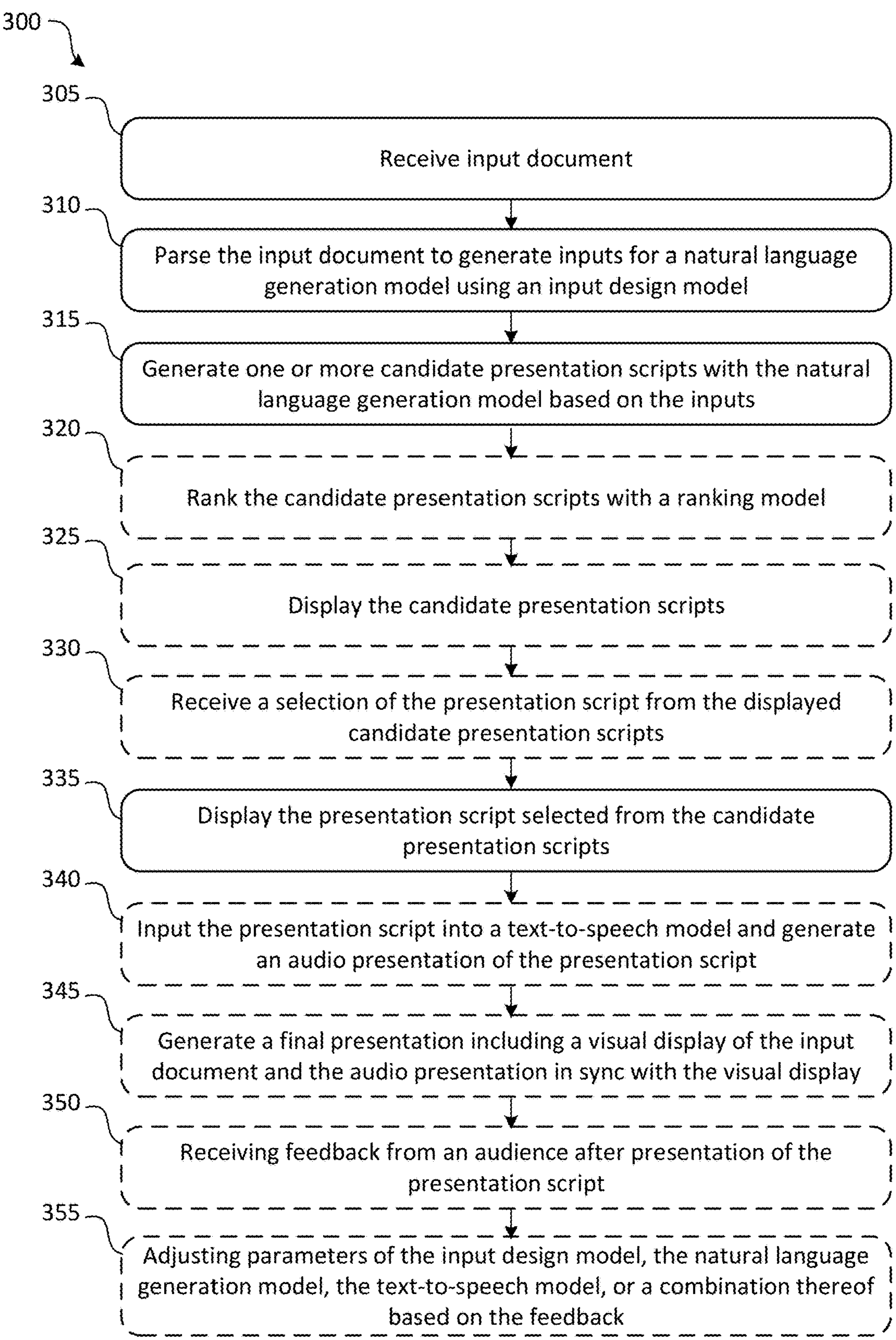
FIG. 3 illustrates a flowchart for automated script generation, according to some embodiments.

FIG. 3 illustrates a method 300 for automatically generating script content using, for example, system 100. At step 305, an input document is received. For example, a user system design component user interface may be used to obtain the document selection from the user. In some embodiments, the content generation application 140 user interface may be used to obtain the input document from the user. The input document may be any document that includes information that can be used to generate a script/speech including, for example, a text-based document generated in a word processing application (e.g., MICROSOFT WORD®), a presentation slide deck generated by a presentation application (e.g., MICROSOFT POWERPOINT®), a spreadsheet document generated by a spreadsheet application (e.g., MICROSOFT EXCEL®), a notes document generated from a note-taking application (e.g., MICROSOFT ONENOTE®), or the like. A document selection component may be used to confirm the desired intent of the user, for example, the desired topic of the script. A bias detection component may be used to determine whether the input document is likely to generate a toxic, biased, or otherwise unwanted output and provide suggestions if needed. At step 310, an input design modelling component (e.g., input design modelling component 115 of FIG. 1) may generate prompts to use as input to one or more natural language generation models for generating candidate scripts at step 315. For example, the input design modelling component may use the input document along with known information about the user (e.g., historical preferences), input examples, and/or an input library to generate the inputs. The input design modelling component may be an AI based component that is trained to generate the best outputs for the given natural language generation models. In some embodiments, the input design modelling component may determine which natural language generation models to use and/or may generate multiple inputs for one or more natural language generation models to ensure the best output (e.g., appropriate length output, best output based on user preferences, sufficient number of candidate scripts, etc.). At optional step 320, the candidate scripts are ranked with a ranking model. At optional step 325, the candidate scripts are displayed to the user. In some embodiments, the candidate scripts are displayed in ranked order. The presentation of the candidate scripts may include an option to review the scripts, modify the scripts, and/or select a final script from the candidate scripts. At optional step 330, a final script selection is received from the candidate scripts. At step 335, the selected presentation script is displayed. For example, the selected script may be displayed for the user to further review and or modify, in some embodiments. Modification may include manual modification by the user. Modification may also include inputting short text requests that are processed by the input model and the natural language generation model to generate a new script or modified portions of the selected script. At optional step 340, the presentation script is input into a TTS model to generate a synthesized audio presentation of the presentation script. The TTS model may generate the synthesized audio in the user's voice using a voice sample from the user in some embodiments. At optional step 345, a final presentation is generated that includes a visual display of the input document and the audio presentation synchronized with the visual display. In some embodiments, if the input document was not a presentation document, any presentation document may be synchronized with the generated synthesized audio to create a final presentation that includes a visual presentation synchronized with the synthesized audio presentation of the generated script. At optional step 350, feedback from an audience is received after presentation of the presentation script or the final presentation. The feedback may relate to the synchronization of the presentation, the quality of the synthesized audio, the content of the selected script, or any other feature of the presentation. The feedback may be used at optional step 355 to adjust parameters of the input design model, the natural language generation model, the TTS model, the synchronization component, or any combination thereof.

Figure 4:
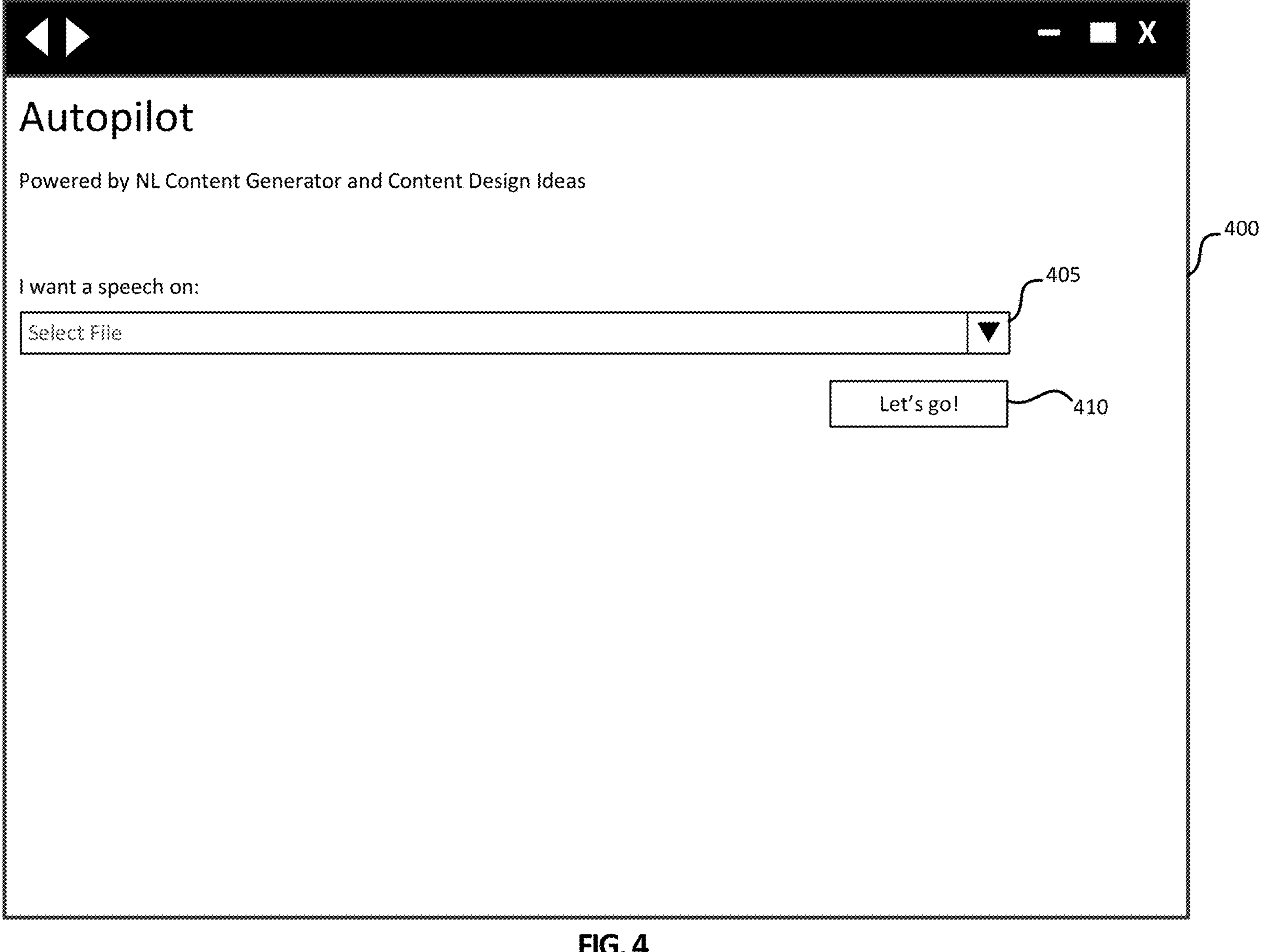
FIG. 4 illustrates an exemplary graphical user interface for a system of automated script generation, according to some embodiments.

FIG. 4 illustrates an exemplary user interface 400 used to interface with the automated script generation system (e.g., user system design components 145, application service component 110). The user interface 400 may be provided to the user for generating scripts based on an input document as described in FIGS. 1-3. FIGS. 4-8 depict exemplary user interfaces for generating a speech, but the topic, number of options, layout, design, and so forth are all provided as examples only and variations are understood to be within the scope of the present disclosure. The initial user interface 400 may include the query box 405 and let's go button 410. This particular user interface 400 may be used with a presentation creation application such as MICROSOFT POWERPOINT® such that the user may request a speech as depicted by the title to the query box 405 based on an input document that may be a presentation created by the user in the content generation application. The user may select a document or file using a dropdown selection option as shown in query box 405. When the user selects the let's go button 410, the process begins to generate a script/speech for the user. In this example, the user has selected a document having content on photosynthesis. For example, a presentation slide deck on photosynthesis.

Once the let's go button 410 is selected, the input document the user selected in the query box 405 is obtained and analyzed by the document selection component as described with respect to FIGS. 1 and 2. The topic of the speech may be determined, for example, and the input document may be sent to the bias detection component to ensure biased, toxic, or otherwise unwanted output is unlikely from the input document. For example, the topic may be determined to be photosynthesis with a high enough confidence or with confirmation from the user, and the bias potential may be sufficiently low such that the document selection component passes the input document and other determined information to an application service component. The application service component provides the information, including the input document, to the input design modelling component to generate one or more inputs using prompt examples, the prompt library, user preference history, global information, edit history, or a combination thereof to create and rank inputs for one or more natural language generation models. In some embodiments, the input design modelling component may select which natural language generation models should be used. The application service component provides the inputs with any necessary parameters to the appropriate natural language generation models. The output from the natural language generation models may be analyzed and ranked to generate a list of candidate scripts.

Figure 5:
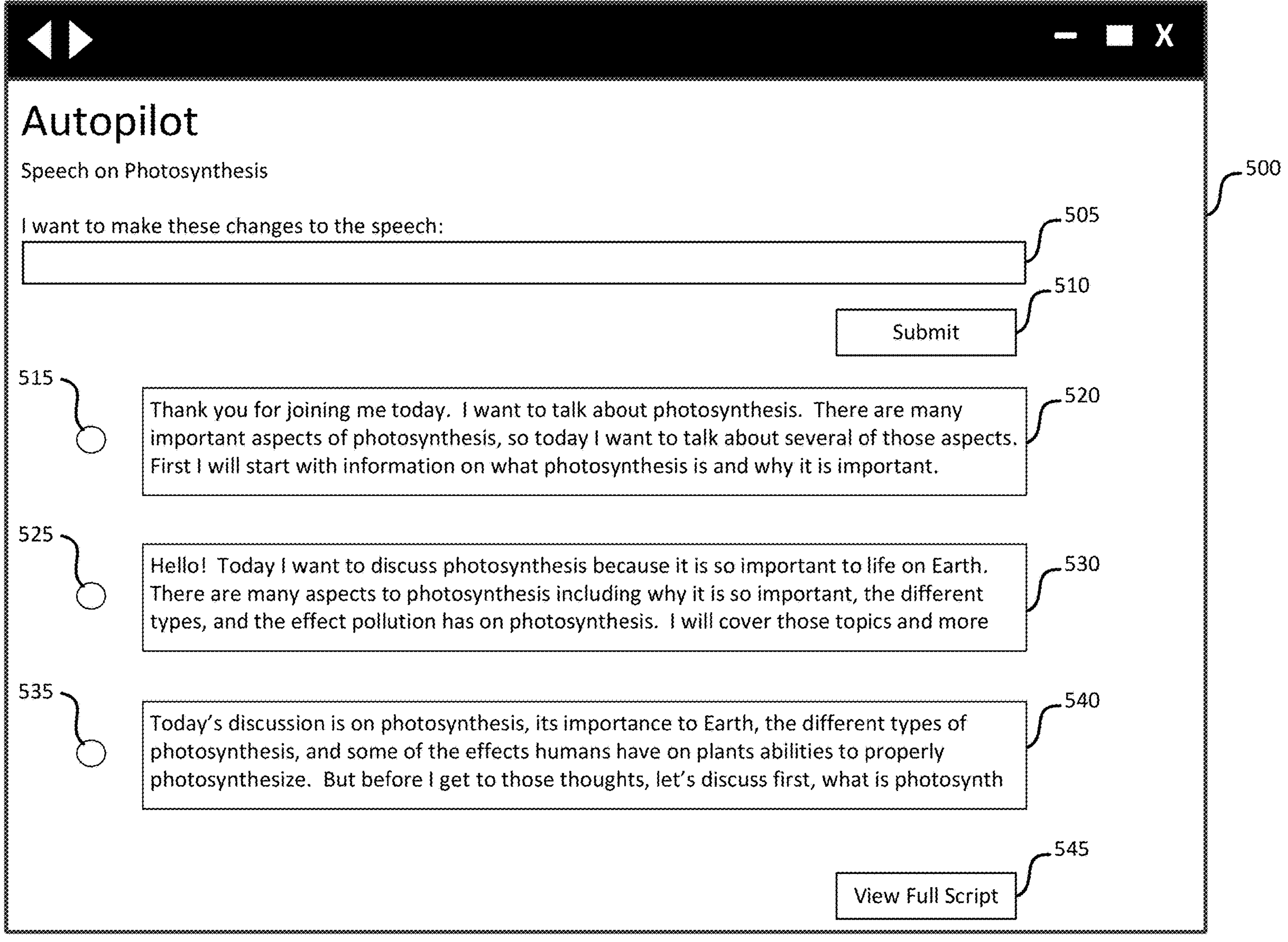
FIG. 5 illustrates another exemplary graphical user interface for a system of automated script generation, according to some embodiments.

FIG. 5 illustrates exemplary graphical user interface 500 that is generated after the user selects the let's go button 410 as shown with respect to FIG. 4. The user interface 500 includes a modification box 505 and an associated submit button 510. Below the submit button 510, several candidate script previews 520, 530, 540 are shown, each with a corresponding radio button 515, 525, 535. The user may select a single candidate script by selecting the associated radio button 515, 525, 535. The user may make a change to the selected candidate script by selecting a radio button 515, 525, 535, entering a change the user would like in the modification box 505, and selecting the submit button 510. If a radio button 515, 525, 535 is not selected, the change may be made to all candidate scripts. Upon selection of the submit button 510, the text in the modification box 505 is analyzed, for example by the document selection component described with respect to FIG. 1 or another similar component. The component may analyze the text to determine, for example, an intent of the text and any bias presented by the text as an input. The text may be submitted to the input design modelling component 115 as described with respect to FIG. 1. An input may be generated and submitted to the natural language model for generation of a modified candidate script. In some embodiments, a portion of the candidate script may be modified and replaced. In some embodiments, the entire candidate script may be regenerated, and the new candidate script may replace the existing candidate script. The user may iterate this process as many times as necessary to obtain a candidate script the user is pleased with. If the user would like to see the entire candidate script on a single screen, the user may select a radio button associated with the desired candidate script and select the view full script button 545 to view the complete script.

Figure 6:
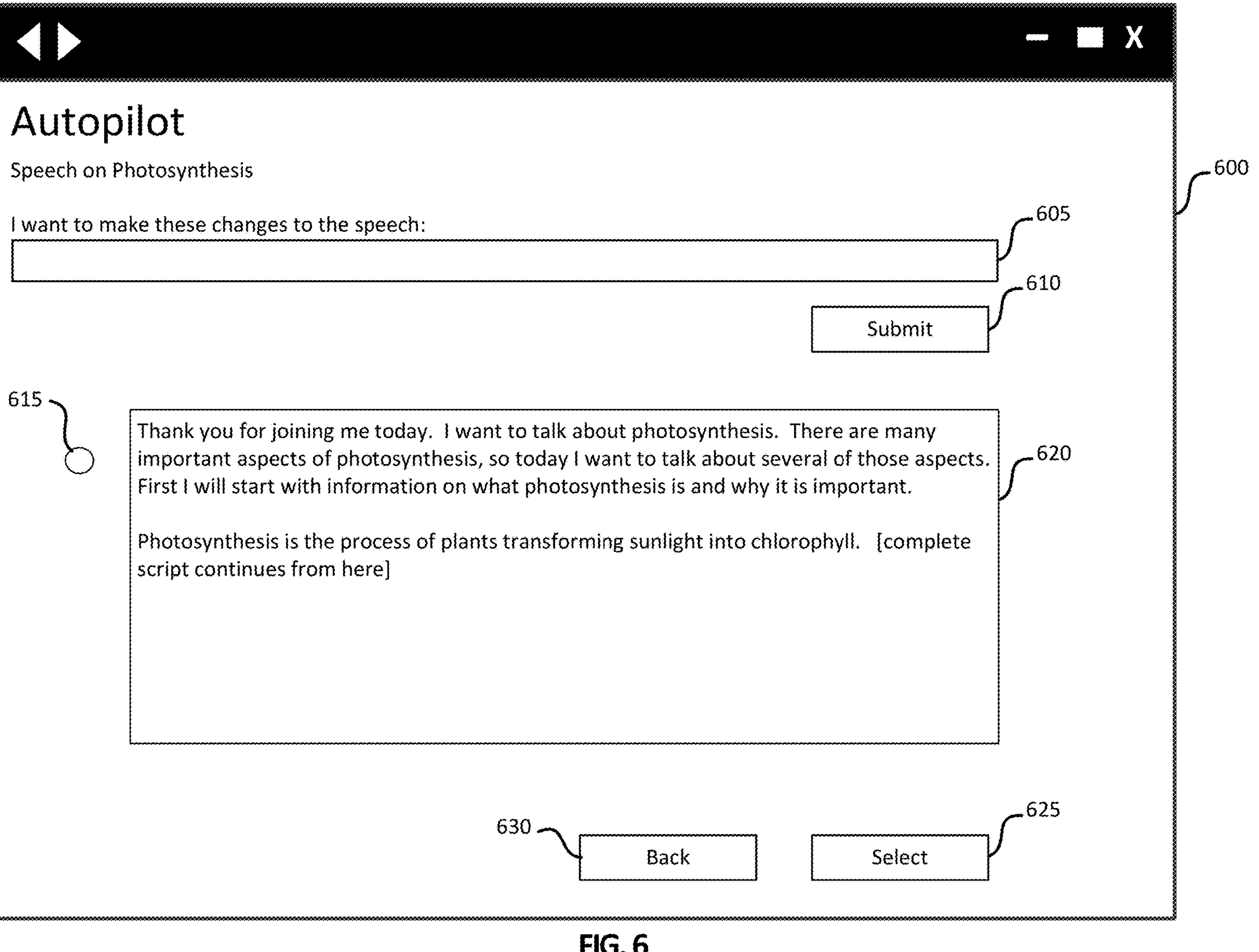
FIG. 6 illustrates another exemplary graphical user interface for a system of automated script generation, according to some embodiments.

FIG. 6 illustrates another exemplary graphical user interface 600, which may be generated upon the user selecting radio button 515 and the view full script button 545. The graphical user interface 600 may have similar selection options as the graphical user interface 500. The user interface 600 includes a modification box 605, submit button 610, radio button 615, script preview 620, select button 625, and back button 630. The user may see more of a candidate script on the screen in script preview 620 along with the corresponding radio button 615. The user may be able to make modifications to the candidate script using the modification box 605 and submit button 610, which modifications are generated as described with respect to modifications in FIG. 5. In some embodiments, the user may modify the text in the script preview 620 by using an input device (e.g., a keyboard and mouse) to modify the text. The user may return to the previous screen by selecting the back button 630. The user may also select the candidate script displayed in script preview 620 by clicking the select button 625.

Figure 7:
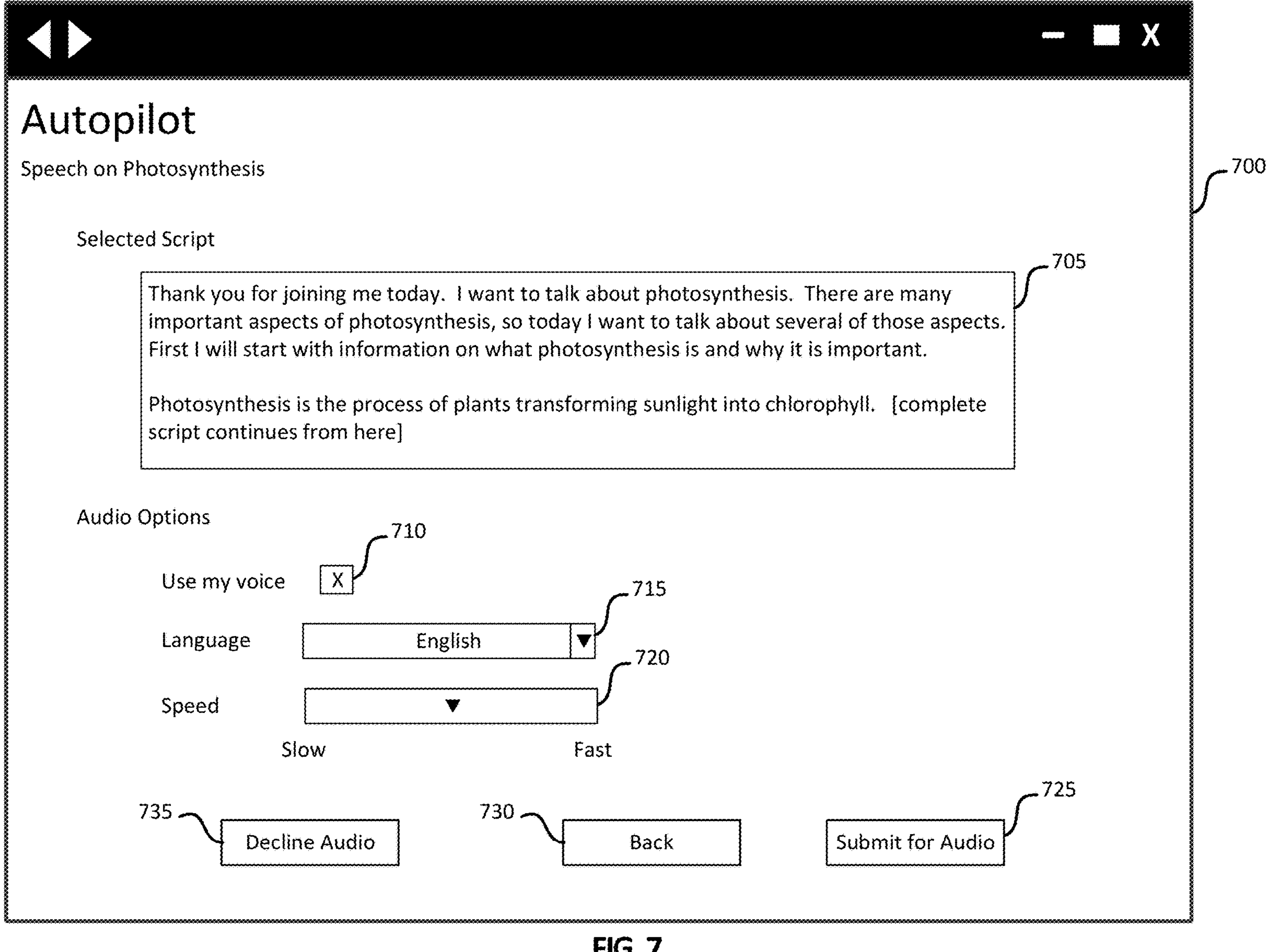
FIG. 7 illustrates another exemplary graphical user interface for a system of automated script generation, according to some embodiments.

FIG. 7 illustrates another exemplary graphical user interface 700 in which the user is now viewing options generating synthesized audio of the selected script shown in script preview box 705. At this point the user may have made modifications as desired to the candidate script and selected such script as the presentation script. In some embodiments, the synthesized audio may be an option the user selects to generate rather than an automatic option. The user may be able to view the selected script in the script preview box 705. Should the user wish to not generate synthesized audio, the user may select the decline audio button 735. Audio options may include that the user may use his or her own voice by selecting box 710, select a language for the audio output by using dropdown 715, and select the speed of the audio by using the speed selector 720. If the user wishes to user her own voice, the system may request an audio sample of the user's voice to generate the synthesized audio. Such sample may be obtained by selection of a file or by input using a different user interface screen (not shown). If the user wishes to change his or her mind about which candidate script is selected, the user may return to the previous screen by selecting the back button 730. Once the user has the desired selected script and the desired audio options selected, the user may generate the audio by clicking the submit for audio button 725. Upon selection of the audio button 725, the selected script and other audio options may be provided to a TTS model as input to generate the synthesized audio output. The synthesized audio output may include one or more audio output candidates, in some embodiments.

Figure 8:
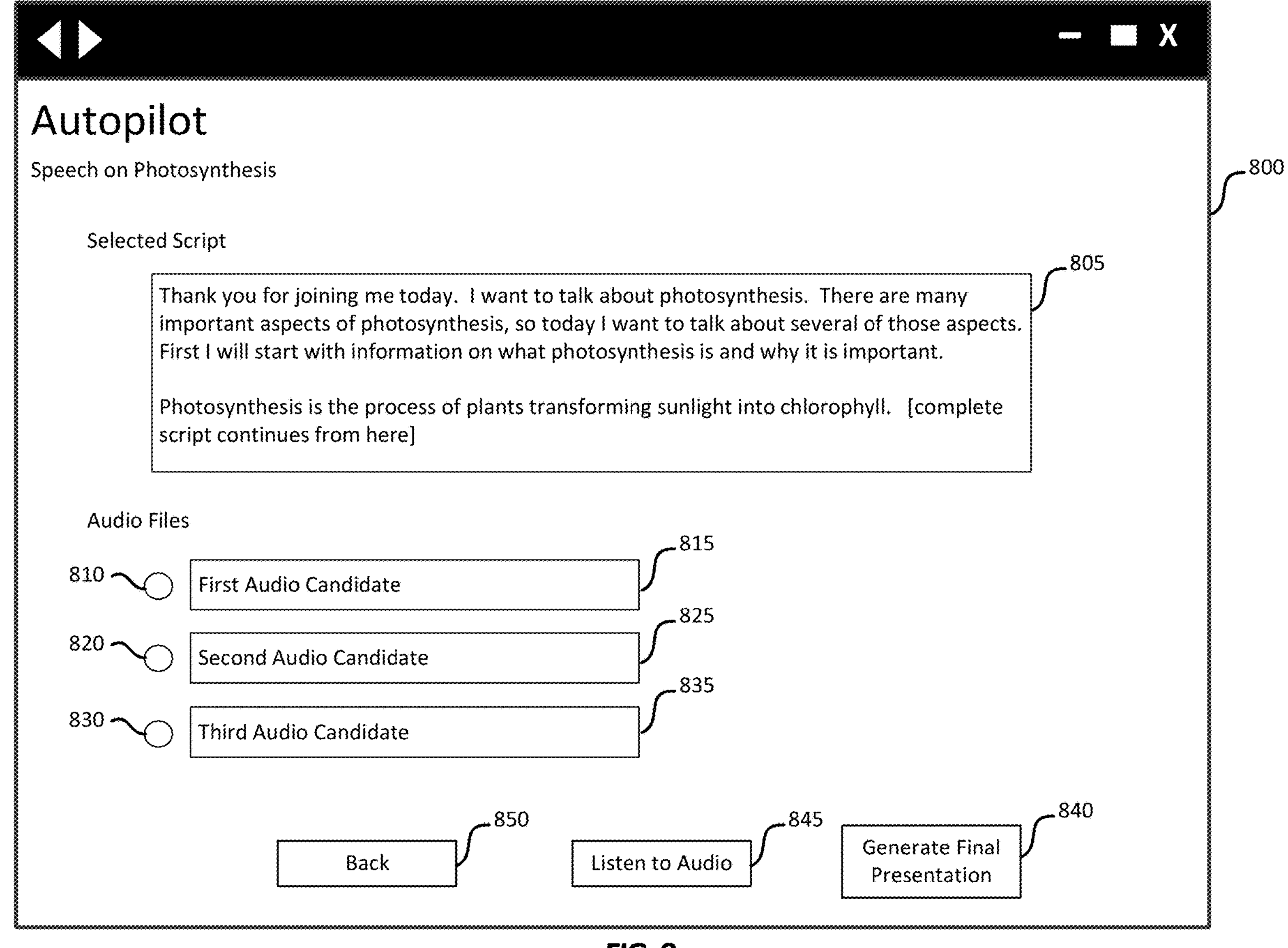
FIG. 8 illustrates another exemplary graphical user interface for a system of automated script generation, according to some embodiments.

FIG. 8 illustrates another exemplary graphical user interface 800 in which the user may select a synthesized audio candidate as the final synthesized audio. The graphical user interface includes a script preview 805 and the audio candidate file names listed as the audio candidates 815, 825, 835 with corresponding radio buttons 810, 820, 830. The user may select a radio button 810, 820, 830 and the listen to audio button 845 to hear the corresponding synthesized audio candidate. If the user dislikes the candidate options or otherwise wishes to return to the previous screen, the user may select the back button 850. The various audio candidates 815, 825, 835 may differ in speed, voice used, language/translation used, or other audio features that may make the candidate more or less appealing to the user. Once the user has selected an audio candidate 815, 825, 835 using the corresponding radio button 810, 820, 830, the user may select the generate final presentation button 840. Upon selection of final presentation button 840, the input document (or other document if another is desired may be selected for use—not shown) and the selected audio candidate are synchronized to generate a final audio-visual presentation that the user may provide or present to an audience. For example, a final presentation component may analyze the synthesized audio that was selected along with the visual document to synchronize the transition between the visual component (e.g., slides), and the audio component such that the corresponding visual portions are displayed during the appropriate time of the audio component. The generated file may be an audio-visual file type of, for example, .mpg, .mp4, .wmv, or any other appropriate file format. The file may be presented to an audience for a single presentation to many at once or distributed to an audience that may ingest the file at their convenience.

Figure 9:
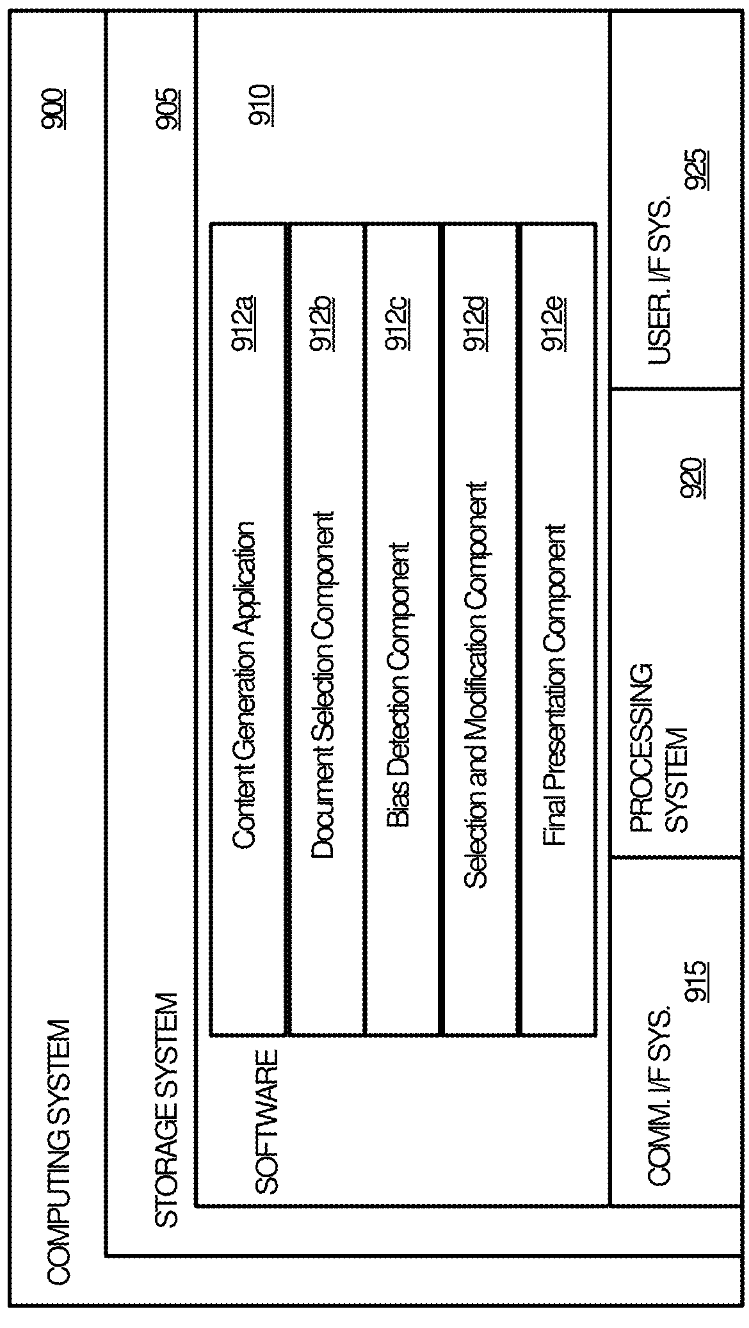
FIG. 9 illustrates an exemplary computer system.

FIG. 9 illustrates a computing system 900 suitable for implementing processing operations described herein related to automatic intelligent content generation, with which aspects of the present disclosure may be practiced. As referenced above, computing system 900 may be configured to implement processing operations of any component described herein including the user system design components (e.g., user system design components 145, application service components 110, input design modelling component 115 of FIG. 1). As such, computing system 900 may be configured as a specific purpose computing device that executes specific processing operations to solve the technical problems described herein including those pertaining to generation of intelligent content for users based on limited text inputs of the user. Computing system 900 may be implemented as a single apparatus, system, or device or may be implemented in a distributed manner as multiple apparatuses, systems, or devices. For example, computing system 900 may comprise one or more computing devices that execute processing for applications and/or services over a distributed network to enable execution of processing operations described herein over one or more applications or services. Computing system 900 may comprise a collection of devices executing processing for front-end applications/services, back-end applications/service or a combination thereof. Computing system 900 comprises, but is not limited to, a processing system 920, a storage system 905, software 910, communication interface system 915, and user interface system 925. Processing system 920 is operatively coupled with storage system 905, communication interface system 915, and user interface system 925. Non-limiting examples of computer system 900 comprise but are not limited to: smart phones, laptops, tablets, PDAs, desktop computers, servers, smart computing devices including television devices and wearable computing devices including VR devices and AR devices, e-reader devices, gaming consoles and conferencing systems, among other non-limiting examples.

Processing system 920 loads and executes software 910 from storage system 905. Software 910 includes one or more software components (e.g., 912*a*, 912*b*, 912*c*, 912*d*, 912*c*) that are configured to enable functionality described herein. In some examples, computing system 900 may be connected to other computing devices (e.g., display device, audio devices, servers, mobile/remote devices, VR devices, AR devices, etc.) to further enable processing operations to be executed. When executed by processing system 920, software 910 directs processing system 920 to operate as described herein for at least the various processes, operational scenarios, and sequences discussed in the foregoing implementations. Computing system 900 may optionally include additional devices, features, or functionality not discussed for purposes of brevity. Computing system 900 may further be utilized as user system 105 or any of the cloud computing systems in system 100 (FIG. 1), flowchart 200 (FIG. 2), method 300 (FIG. 3) and/or the accompanying description of FIGS. 4-8.

Referring still to FIG. 9, processing system 920 may comprise processor, a micro-processor and other circuitry that retrieves and executes software 910 from storage system 905. Processing system 920 may be implemented within a single processing device but may also be distributed across multiple processing devices or sub-systems that cooperate in executing program instructions. Examples of processing system 920 include general purpose central processing units, microprocessors, graphical processing units, application specific processors, sound cards, speakers and logic devices, gaming devices, VR devices, AR devices as well as any other type of processing devices, combinations, or variations thereof.

Storage system 905 may comprise any computer readable storage media readable by processing system 920 and capable of storing software 910. Storage system 905 may include volatile and nonvolatile, removable and non-removable media implemented in any method or technology for storage of information, such as computer readable instructions, data structures, program modules, cache memory or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer readable storage media a propagated signal.

In addition to computer readable storage media, in some implementations storage system 905 may also include computer readable communication media over which at least some of software 910 may be communicated internally or externally. Storage system 905 may be implemented as a single storage device but may also be implemented across multiple storage devices or sub-systems co-located or distributed relative to each other. Storage system 905 may comprise additional elements, such as a controller, capable of communicating with processing system 920 or possibly other systems.

Software 910 may be implemented in program instructions and among other functions may, when executed by processing system 920, direct processing system 920 to operate as described with respect to the various operational scenarios, sequences, and processes illustrated herein. For example, software 910 may include program instructions for executing one or more content generation applications 912*a* as described herein. Software 910 may also include program instructions for executing one or more document selection components 912*b* for helping the user identify a document, one or more bias detection components 912*c* for determining a bias potential of model output, one or more selection and modification components 912*d* for guiding the user in selection of outputs and modification of the outputs so that a final script can be generated, and/or one or more final presentation components 912*e* for processing the output into a final presentation in which the audio and visual are synchronized, as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 910 may include additional processes, programs, or components, such as operating system software, virtual machine software, or other application software. Software 910 may also comprise firmware or some other form of machine-readable processing instructions executable by processing system 920.

In general, software 910 may, when loaded into processing system 920 and executed, transform a suitable apparatus, system, or device (of which computing system 900 is representative) overall from a general-purpose computing system into a special-purpose computing system customized to execute specific processing components described herein as well as process data and respond to queries. Indeed, encoding software 910 on storage system 905 may transform the physical structure of storage system 905. The specific transformation of the physical structure may depend on various factors in different implementations of this description. Examples of such factors may include, but are not limited to, the technology used to implement the storage media of storage system 905 and whether the computer-storage media are characterized as primary or secondary storage, as well as other factors.

For example, if the computer readable storage media are implemented as semiconductor-based memory, software 910 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 915 may include communication connections and devices that allow for communication with other computing systems (not shown) over communication networks (not shown). Communication interface system 915 may also be utilized to cover interfacing between processing components described herein. Examples of connections and devices that together allow for inter-system communication may include network interface cards or devices, antennas, satellites, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 925 may include a keyboard, a mouse, a voice input device, a touch input device for receiving a touch gesture from a user, a motion input device for detecting non-touch gestures and other motions by a user, gaming accessories (e.g., controllers and/or headsets) and other comparable input devices and associated processing elements capable of receiving user input from a user. Output devices such as a display, speakers, haptic devices, and other types of output devices may also be included in user interface system 925. In some cases, the input and output devices may be combined in a single device, such as a display capable of displaying images and receiving touch gestures. The aforementioned user input and output devices are well known in the art and need not be discussed at length here.

User interface system 925 may also include associated user interface software executable by processing system 920 in support of the various user input and output devices discussed above. Separately or in conjunction with each other and other hardware and software elements, the user interface software and user interface devices may support a graphical user interface, a natural user interface, or any other type of user interface, for example, that enables front-end processing and including rendering of, for example, user interfaces 400-800. Exemplary applications/services may further be configured to interface with processing components of computing system 900 that enable output of other types of signals (e.g., audio output, handwritten input) in conjunction with operation of exemplary applications/services (e.g., a collaborative communication application/service, electronic meeting application/service, etc.) described herein.

Communication between computing system 900 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous Javascript and XML), Bluetooth, infrared, RF, cellular networks, satellite networks, global positioning systems, as well as any other suitable communication protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A system, comprising:

an application component configured to:

receive, from a user device, a user request comprising a presentation slide deck and a request for a written speech to accompany the presentation slide deck, transmit the presentation slide deck to an input design component, receive a prompt from the input design component, submit the prompt to a generative natural language model, receive a candidate presentation script for a speech on a topic of the presentation slide deck, and transmit the candidate presentation script to the user device; and the input design component comprising an input design model, the input design component configured to:

receive the presentation slide deck from the application component, determine a topic of the presentation slide deck, provide the presentation slide deck, the topic, and user information as design inputs to the input design model trained to generate the prompt for the generative natural language model based on the design inputs, wherein the prompt is designed to elicit the candidate presentation script for the speech on the topic and designed to audibly accompany a visual display of the presentation slide deck, receive the prompt from the input design model, and transmit the prompt to the application component.

2. The system of claim 1, wherein:

the application component is further configured to:

receive a request for a modification of the candidate presentation script, wherein the request comprises a natural language entry, provide the natural language entry to the input design component, receive a revised prompt from the input design component, submit the revised prompt to the generative natural language model, receive a revised presentation script, and transmit the revised presentation script to the user device; and the input design component is further configured to:

receive the natural language entry from the application component, generate the revised prompt with the input design model based at least in part on the natural language entry, and transmit the revised prompt to the application component.

3. The system of claim 1, wherein the application component is further configured to:

receive a plurality of candidate presentation scripts from one or more generative natural language models; and transmit the plurality of candidate presentation scripts to the user device.

4. The system of claim 3, further comprising:

a script ranking component configured to rank the plurality of candidate presentation scripts; and wherein the application component is further configured to request ranking of the plurality of candidate presentation scripts from the script ranking component prior to transmitting the plurality of candidate presentation scripts to the user device.

5. The system of claim 4, wherein the script ranking component is further configured to rank the plurality of candidate presentation scripts based on known preferences of a user that provided the user request, completeness of the respective candidate presentation script, a likelihood that the respective candidate presentation script meets criteria of the user, or a combination thereof.

6. The system of claim 1, further comprising:

a text-to-speech component configured to:

generate an audio presentation of the candidate presentation script using a text-to-speech model; and a synchronization component configured to:

generate a final presentation including a visual display of the presentation slide deck synchronized with the audio presentation.

7. The system of claim 6, wherein:

the application component is further configured to receive feedback from an audience subsequent to presenting the final presentation to the audience;

the input design component is further configured to adjust parameters of the input design model based on the feedback; and the synchronization component is further configured to adjust parameters for synchronization based on the feedback.

8. The system of claim 6, wherein the text-to-speech component is further configured to:

generate the audio presentation in a voice based on a voice sample of the voice.

9. The system of claim 6, further comprising:

a translation component configured to translate the audio presentation to a different language.

10. The system of claim 1, wherein:

the application component is further configured to receive feedback from an audience subsequent to presenting the presentation slide deck using the candidate presentation script; and the input design component is further configured to adjust parameters of the input design model based on the feedback.

11. A computer-implemented method, comprising:

receiving, from a user device of a user, a user request comprising a presentation slide deck and a request for a written speech to accompany the presentation slide deck;

generating a prompt for a generative natural language model, wherein the prompt is designed to elicit a response comprising a candidate presentation script for a speech on a topic of the presentation slide deck and designed to audibly accompany a visual display of the presentation slide deck, wherein the generating the prompt comprises:

determining the topic of the presentation slide deck, and generating, with an input design model, the prompt based on design inputs comprising the presentation slide deck, the topic, and user information of the user;

submitting the prompt to the generative natural language model;

receiving the candidate presentation script for the speech on the topic of the presentation slide deck; and causing display of the candidate presentation script on the user device.

12. The computer-implemented method of claim 11, further comprising:

receiving a request for a modification of the candidate presentation script, wherein the request comprises a natural language entry;

generating a revised prompt using the input design model based at least in part on the natural language entry;

submitting the revised prompt to the generative natural language model;

receiving a revised presentation script; and transmitting the revised presentation script to the user device.

13. The computer-implemented method of claim 11, further comprising:

receiving a plurality of candidate presentation scripts from one or more generative natural language models; and transmitting the plurality of candidate presentation scripts to the user device.

14. The computer-implemented method of claim 13, further comprising:

ranking the plurality of candidate presentation scripts prior to transmitting the plurality of candidate presentation scripts to the user device.

15. The computer-implemented method of claim 14, wherein ranking the plurality of candidate presentation scripts is based on known preferences of the user, completeness of the respective candidate presentation script, a likelihood that the respective candidate presentation script meets criteria of the user, or a combination thereof.

16. The computer-implemented method of claim 11, further comprising:

generating an audio presentation of the candidate presentation script using a text-to-speech model; and generating a final presentation including a visual display of the presentation slide deck synchronized with the audio presentation.

17. The computer-implemented method of claim 16, further comprising:

receiving feedback from an audience subsequent to presenting the final presentation to the audience;

adjusting parameters of the input design model based on the feedback; and adjusting parameters for synchronization of the final presentation based on the feedback.

18. The computer-implemented method of claim 16, wherein the audio presentation is generated in a voice based on a voice sample of the voice.

19. The computer-implemented method of claim 16, further comprising:

translating the audio presentation to a different language.

20. The computer-implemented method of claim 11, further comprising:

receiving feedback from an audience subsequent to presenting the presentation slide deck using the candidate presentation script; and adjusting parameters of the input design model based on the feedback.

* * * * *